US012657373B2

(12) United States Patent
Pividori et al.

(10) Patent No.: US 12,657,373 B2
(45) Date of Patent: Jun. 16, 2026

(54) ACADEMIC EDITING ENGINE(S) FOR ATTRIBUTION AND REVISION OF SCHOLARLY AUTHORING

(71) Applicant: The Regents of the University of Colorado, Denver, CO (US)

(72) Inventors: Milton Pividori, Philadelphia, PA (US); Casey S. Greene, Denver, CO (US)

(73) Assignees: The Regents of the University of Colorado, Denver, CO (US); The Trustees of the University of Pennsylvania, Philadelphia, PA (US)

( * ) Notice: Subject to any disclaimer, the term of this patent is extended or adjusted under 35 U.S.C. 154(b) by 293 days.

(21) Appl. No.: 18/585,668

(22) Filed: Feb. 23, 2024

(65) Prior Publication Data

US 2024/0289540 A1 Aug. 29, 2024

Related U.S. Application Data

(60) Provisional application No. 63/486,706, filed on Feb. 24, 2023.

(51) Int. Cl.
*G06F 40/166* (2020.01)
*G06F 40/197* (2020.01)

(52) U.S. Cl.
CPC .......... *G06F 40/166* (2020.01); *G06F 40/197* (2020.01)

(58) Field of Classification Search
None
See application file for complete search history.

(56) References Cited

U.S. PATENT DOCUMENTS

| | | | |
|---|---|---|---|
| 2004/0085354 A1* | 5/2004 | Massand | H04L 67/10 |
| | | | 707/E17.008 |
| 2008/0021922 A1* | 1/2008 | Hailpern | G06F 21/6227 |
| 2024/0256762 A1* | 8/2024 | Beauchamp | G06F 40/166 |

OTHER PUBLICATIONS

Pividori, Milton et al., Pre-Print of "A Publishing Infrastructure For AI-Assisted Academic Authoring," bioRxiv, 17 pages, Jan. 23, 2023.

* cited by examiner

*Primary Examiner* — Maria S Ayad

(57) ABSTRACT

Example systems and methods for providing an academic editor engine are provided herein. For example, an academic editor engine receives a request to revise a section of a scholarly manuscript. Responsive to the request, the academic editor engine determines a section type for the section. The academic editor engine then generates a prompt based on the section type and provides the prompt and the section to a content generator. The academic editor engine receives a revised section having revisions to the section from the content generator and provides a display of the revised section spatially proximate to the section to a client device. The academic editor engine receives an indication from the client device to accept one or more of the revisions as accepted revisions and generates a revised draft including the accepted revisions and an author attribution to the content generator for the accepted revisions.

19 Claims, 11 Drawing Sheets

300

RECEIVE, BY AN ACADEMIC EDITR ENGINE, A REQUEST TO REVISE A FIRST SECTION OF A SCHOLARLY MANUSCRIPT — 305

DETERMINE, BY THE ACADEMIC EDITOR ENGINE, A SECTION TYPE FOR THE FIRST SECTION — 310

DETERMINE, BY THE ACADEMIC EDITOR ENGINE, ONE OR MORE PROPERTIES OF THE SCHOLARY MANUSCRIPT — 315

GENERATE, BY THE ACADEMIC EDITOR ENGINE, A FIRST PROMPT BASED ON THE SECTION TYPE FOR THE FIRST SECTION — 320

PROVIDE, BY THE ACADEMIC EDITOR ENGINE, THE FIRST PROMPT AND THE FIRST SECTION TO A CONTENT GENERATOR — 325

RECEIVE, BY THE ACADEMIC EDITOR ENGINE, A FIRST REVISED SECTION OF THE FIRST SECTION FROM THE CONTENT GENERATOR — 330

GENERATE, BY THE ACADEMIC EDITOR ENGINE, A FIRST DISPLAY OF THE FIRST REVISED SECTION SPATIALLY PROXIMATE TO THE FIRST SECTION — 335

RECEIVE, BY THE ACADEMIC EDITOR ENGINE, AN INDICATION FROM THE FIRST CLIENT DEVICE TO ACCEPT ONE OR MORE REVISIONS — 340

GENERATE, BY THE ACADEMIC EDITOR ENGINE, A FIRST REVISED DRAFT OF THE FIRST SECTION INCLUDING THE FIRST ACCEPTED REVISIONS — 345

*FIG. 3*

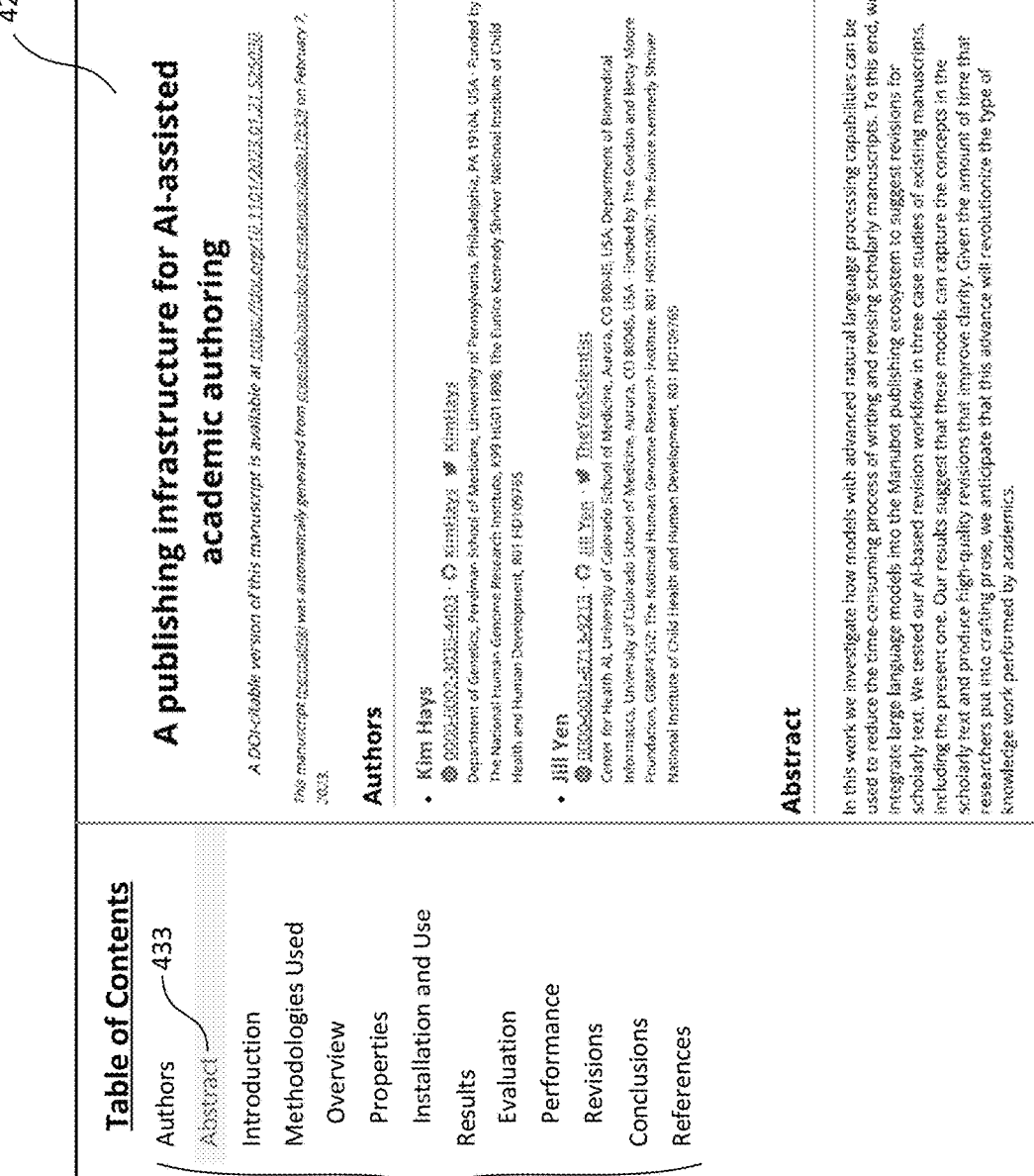

Table of Contents

Authors — 433

Abstract

Introduction

Methodologies Used

Overview

Properties

Installation and Use

Results

Evaluation

Performance

Revisions

Conclusions

References

432

428

A publishing infrastructure for AI-assisted academic authoring

*A DOI-citable version of this manuscript is available at https://doi.org/10.1101/2023.01.11.523030*

*This manuscript (permalink) was automatically generated from cryostobia/manubot-ai-editor:0b4b29 on February 2, 2023.*

Authors

*   Kim Hays

⊚ 0000-0002-3035-4403 · ○ KimHays · ✺ KimHays

Department of Genetics, Perelman School of Medicine, University of Pennsylvania, Philadelphia, PA 19104, USA · Funded by The National Human Genome Research Institute, K99 HG011996; The Eunice Kennedy Shriver National Institute of Child Health and Human Development, R01 HD109765

*   Jill Yen

⊚ 0000-0001-6511-3263 · ○ Jill Yen · ✺ TheYenScientist

Center for Health AI, University of Colorado School of Medicine, Aurora, CO 80045, USA; Department of Biomedical Informatics, University of Colorado School of Medicine, Aurora, CO 80045, USA · Funded by The Gordon and Betty Moore Foundation, GBMF4552; The National Human Genome Research Institute, R01 HG006265; The Eunice Kennedy Shriver National Institute of Child Health and Human Development, R01 HD109765

Abstract

In this work, we investigate how models with advanced natural language processing capabilities can be used to reduce the time-consuming process of writing and revising scholarly manuscripts. To this end, we integrate large language models into the Manubot publishing ecosystem to suggest revisions for scholarly text. We tested our AI-based revision workflow in three case studies of existing manuscripts, including the present one. Our results suggest that these models can capture the concepts in the scholarly text and produce high-quality revisions that improve clarity. Given the amount of time that researchers put into crafting prose, we anticipate that this advance will revolutionize the type of knowledge work performed by academics.

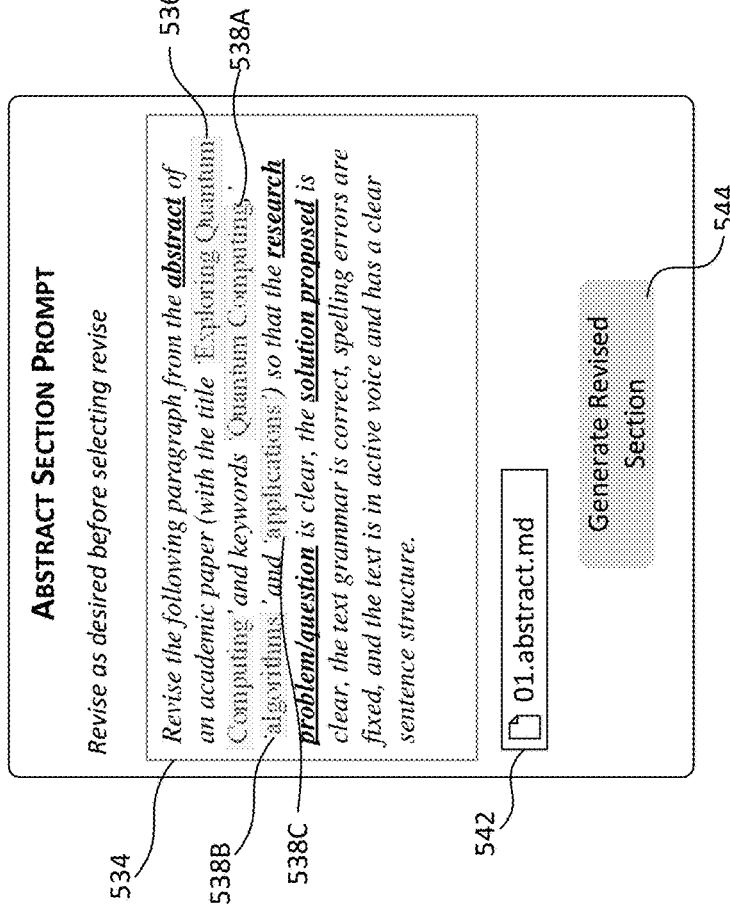

500

ABSTRACT SECTION PROMPT

*Revise as desired before selecting revise*

534

*Revise the following paragraph from the abstract of an academic paper (with the title* Exploring Quantum Computing *'and keywords* Quantum Computing, algorithms, *'and* applications *') so that the research problem/question is clear, the solution proposed is clear, the text grammar is correct, spelling errors are fixed, and the text is in active voice and has a clear sentence structure.*

536

538A

538B

538C 01.abstract.md

542

Generate Revised Section

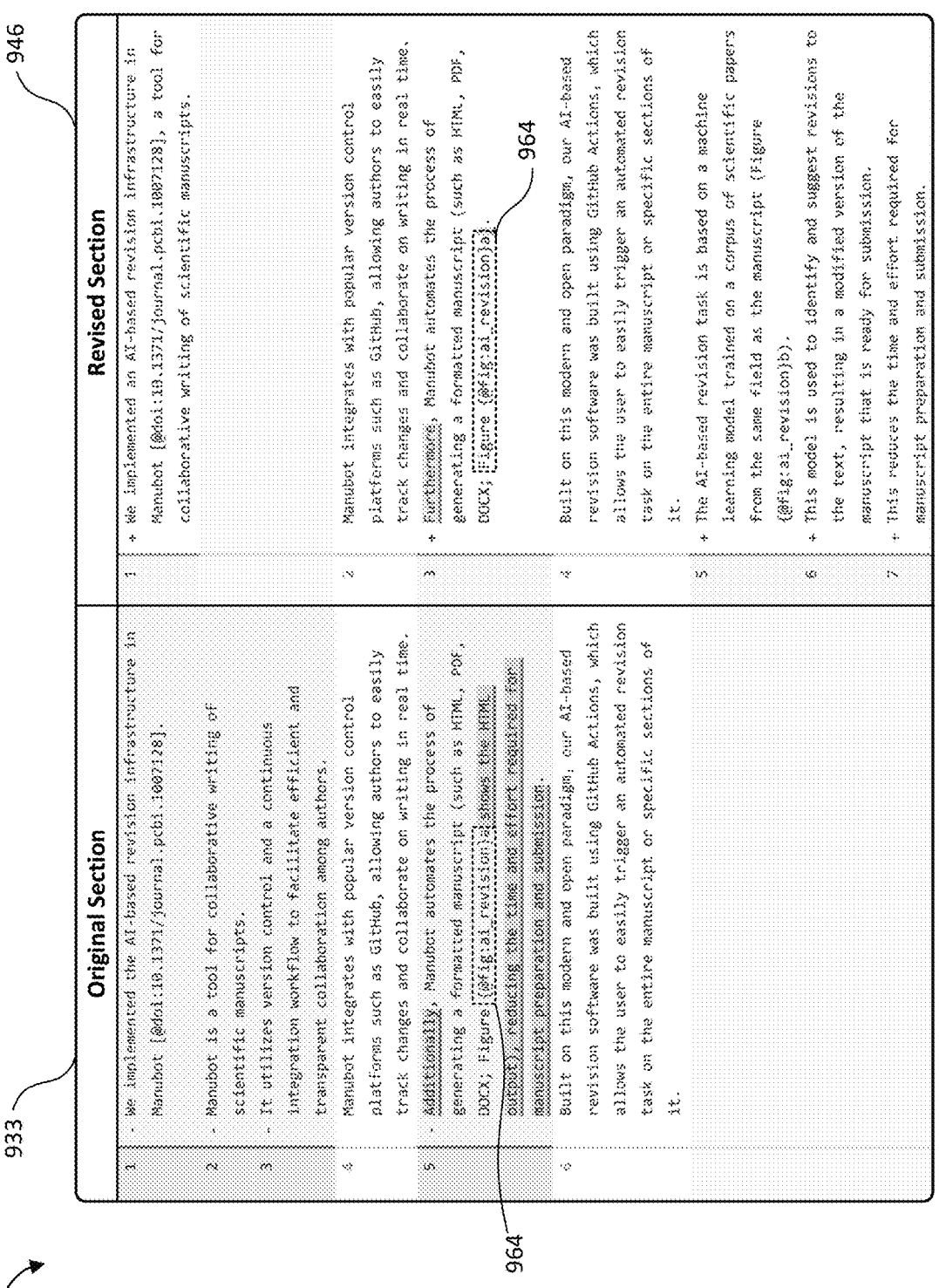

| | Original Section |
|---|---|
| 1 | - We implemented the AI-based revision infrastructure in Manubot [@doi:10.1371/journal.pcbi.1007128]. |
| 2 | - Manubot is a tool for collaborative writing of scientific manuscripts. |
| 3 | - It utilizes version control and a continuous integration workflow to facilitate efficient and transparent collaboration among authors. |
| 4 | - Manubot integrates with popular version control platforms such as GitHub, allowing authors to easily track changes and collaborate on writing in real time. |
| 5 | - Additionally, Manubot automates the process of generating a formatted manuscript (such as HTML, PDF, DOCX; Figure {@fig:ai_revision}) shows the HTML output, reducing the time and effort required for manuscript preparation and submission. |
| 6 | - Built on this modern and open paradigm, our AI-based revision software was built using GitHub Actions, which allows the user to easily trigger an automated revision task on the entire manuscript or specific sections of it. |

| | Revised Section |
|---|---|
| 1 | + We implemented an AI-based revision infrastructure in Manubot [@doi:10.1371/journal.pcbi.1007128], a tool for collaborative writing of scientific manuscripts. |
| 2 | + Manubot integrates with popular version control platforms such as GitHub, allowing authors to easily track changes and collaborate on writing in real time. |
| 3 | + Furthermore, Manubot automates the process of generating a formatted manuscript (such as HTML, PDF, DOCX; Figure {@fig:ai_revision}). |
| 4 | + Built on this modern and open paradigm, our AI-based revision software was built using GitHub Actions, which allows the user to easily trigger an automated revision task on the entire manuscript or specific sections of it. |
| 5 | + The AI-based revision task is based on a machine learning model trained on a corpus of scientific papers from the same field as the manuscript (Figure {@fig:ai_revision}b). |
| 6 | + This model is used to identify and suggest revisions to the text, resulting in a modified version of the manuscript that is ready for submission. |
| 7 | + This reduces the time and effort required for manuscript preparation and submission. |

COMPUTING SYSTEM     <u>1101</u>

STORAGE SYSTEM     <u>1103</u>

SOFTWARE     <u>1105</u>

ACADEMIC EDITOR PROCESS     <u>1106</u>

COMM. I/F SYS.     <u>1107</u>

PROCESSING SYSTEM     <u>1102</u>

USER. I/F SYS.     <u>1109</u>

ACADEMIC EDITING ENGINE(S) FOR ATTRIBUTION AND REVISION OF SCHOLARLY AUTHORING

STATEMENT REGARDING FEDERALLY SPONSORED RESEARCH

This invention was made with government support under grant numbers HD109765, HG010067 and HG011898 awarded by the National Institutes of Health. The government has certain rights in the invention.

TECHNICAL FIELD

Various embodiments of the present technology generally relate to scholarly authoring platforms. More specifically, embodiments of the present technology relate to systems and methods for providing an academic editing engine for authorship attribution and revision.

BACKGROUND

A scholarly authorship or manuscript represents a carefully crafted contribution to academic knowledge, embodying the outcomes of systematic research and scholarly inquiry within the scientific community. These manuscripts, often in the form of research papers or articles, serve as vessels of new insights, methodologies, and discoveries. The production of a scholarly manuscript demands adherence to rigorous standards of evidence, clarity, and logical coherence. Following completion, these works undergo a thorough peer review process, ensuring the validation of their content before dissemination. Scholarly authorship is instrumental in the scientific community as it not only communicates original research but also establishes a foundation for the advancement of knowledge in a given field. Manuscripts serve as a means of sharing findings, engaging in scholarly discourse, and contributing to the ongoing dialogue that propels scientific understanding forward. Through publication in reputable journals, scholarly authorship becomes a vital mechanism for knowledge dissemination, enabling researchers to share their work with the broader academic community and fostering a culture of intellectual exchange and collaboration.

In response to the demanding requirements of scholarly authorship, authors are increasingly turning to artificial intelligence (AI) models or generative technologies to aid in the drafting process. These advanced tools offer assistance in structuring content, refining language, and ensuring adherence to formatting guidelines, thereby streamlining the complex task of crafting academic manuscripts. However, this growing reliance on AI in scholarly drafting has given rise to a notable concern within the scientific community regarding authorship attribution. The collaborative interplay between human authors and AI systems has created challenges in discerning the individual contributions of each entity. As the boundaries between human and machine-generated content blur, there is a heightened awareness of the need for transparent guidelines and mechanisms for attributing authorship. The scientific community is increasingly calling for robust systems that can distinguish and credit the distinct roles played by researchers and AI technologies in the production of scholarly works, ensuring ethical standards and maintaining the integrity of academic authorship.

Accordingly, there exists a need for improved academic editing engine(s) as provided herein that aid authors with navigating the intricacies of scholarly drafting while clearly identifying attribution of content within the manuscript as it is drafted and revised.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing an academic editor engine and its related functions. In an example, a system may include an academic editor engine that aids authors in drafting a scholarly manuscript. In particular, the academic editor engine may receive a request to revise a section of a scholarly manuscript from a first client device. The first client device may correspond to an author of the scholarly manuscript. As those skilled in the art readily appreciate, the scholarly manuscript may include a variety of sections, such as an abstract, introduction, methods, results, and conclusion, and the section selected for revision may be one of these sections.

Responsive to receiving the request to revise the section, the academic editor engine may determine a section type for the section and determine one or more properties of the scholarly manuscript. The academic editor engine may then generate a prompt based on the section type of the properties of the scholarly manuscript. Responsive to generating the prompt, the academic editor engine may provide the prompt along with the section to a content generator. Responsive to receiving the prompt and the section, the content generator generates a revised section having revisions and provides the revised section to the academic editor engine.

Once the academic editor engine receives the revised section, the academic editor engine generates a display of the revised section spatially proximate to the section and provides the display to the client device. As will be described in greater detail below, the author may review the revisions made to the section via the display and indicate whether to accept, modify or reject each of the revisions. Responsive to receiving such an indication, the academic editor engine may generate a revised draft of the section incorporating the revisions as accepted or rejected by the author. Within the revised draft, the academic editor engine includes an author attribution for the content within the revised draft, indicating what segments of content is generated by the author and which content is generated by the content generator (e.g., corresponds to the revisions accepted by the author). In some cases, the author attribution also indicates that the author accepted the revisions.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 3 illustrates an example academic editor engine process, according to an embodiment herein.

FIG. 4 illustrates an example overview of a manuscript, according to an embodiment herein.

FIG. 5 illustrates an example prompt, according to an embodiment herein.

FIG. 9 illustrates another example display of an original section and a revised section having content visibly altered to indicate revisions, according to an embodiment herein.

Figure 1:
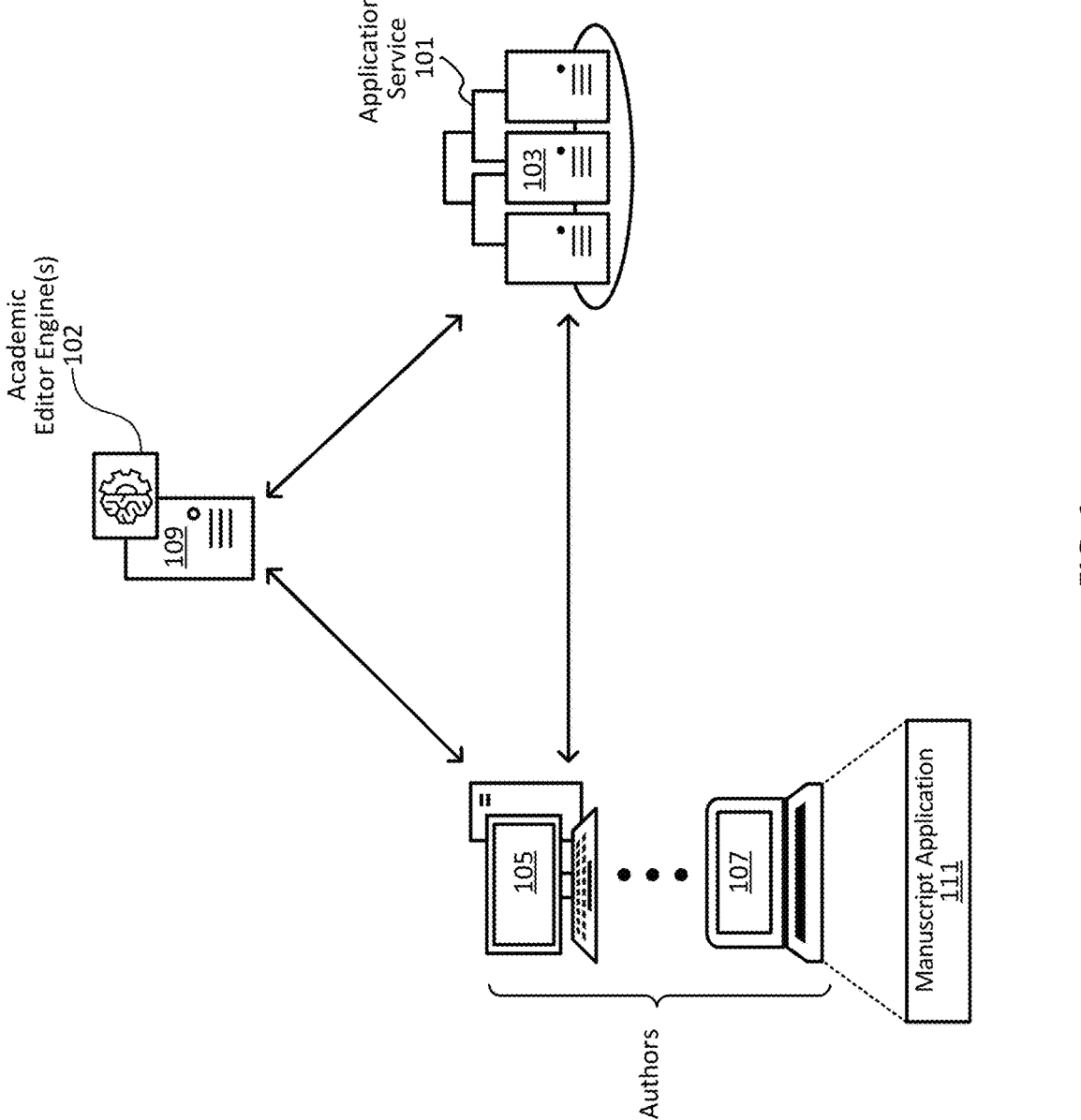
FIG. 1 illustrates an example operational environment for a system for providing one or more features of an academic editor engine, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A scholarly authorship or manuscript constitutes a meticulously crafted contribution to academic knowledge, encapsulating the results of systematic research and scholarly inquiry within the scientific community. Typically manifesting as research papers, literature reviews, technical reports, technical descriptions of experiments or clinical trials, or articles, these documents, here termed manuscripts, serve as conduits for presenting fresh insights, methodologies, and discoveries. The creation of a scholarly manuscript necessitates strict adherence to exacting standards of evidence, clarity, and logical coherence. Upon completion, these works often undergo a rigorous peer review process to validate their content before dissemination. Scholarly authorship plays a pivotal role in the scientific community by not only communicating original research but also establishing a cornerstone for knowledge advancement in a specific field. In other words, manuscripts function as a means to share findings, partake in scholarly discourse, inform public policy and contribute to an ongoing dialogue that propels scientific understanding. Published in reputable journals, scholarly authorship serves as a vital mechanism for disseminating knowledge, enabling researchers to share their work with the wider academic community and fostering a culture of intellectual exchange and collaboration.

Scholars often struggle with drafting scholarly manuscripts due to the rigid requirements imposed on each section of the document. Academic writing demands a meticulous adherence to specific guidelines for structuring diverse components such as the abstract, introduction, literature review, methodology, results, and conclusion. These sections must conform not only to universally accepted formatting norms but also to discipline-specific standards, citation styles, and linguistic conventions. The difficulties in appropriately forming and drafting these sections arise from the need to strike a delicate balance between clarity, conciseness, and comprehensive coverage of the research. Authors grapple with the intricate task of seamlessly integrating evidence, articulating theoretical frameworks, and conveying complex findings while adhering to the prescribed structure. This complexity is exacerbated by the nuanced expectations of scholarly discourse, requiring authors to navigate the intricate landscape of academic writing with precision. The challenges posed by these rigorous requirements underscore the necessity for a sophisticated understanding of the intricacies inherent in scholarly authorship.

The rigid requirements of scholarly manuscript drafting have prompted authors to increasingly leverage AI or generative technologies to grapple with the intricacies of formatting, structure, and linguistic conventions. These advanced tools, while aiding in the drafting process, introduce a unique set of challenges, particularly concerning AI system hallucinations. The nuanced nature of scholarly writing, characterized by domain-specific intricacies and subtle nuances, poses difficulties for AI models in accurately interpreting and representing academic expression. Issues such as potential biases in training data, limited contextual understanding, and the propensity for AI systems to generate information that may deviate from scholarly standards are pressing concerns. As authors navigate the integration of AI into the drafting process, there is a growing need for heightened vigilance regarding the reliability, accuracy, and adherence to academic norms in AI-generated content within scholarly manuscripts. The evolving dialogue within the academic community emphasizes the imperative of critically assessing and mitigating the challenges posed by AI-based information to uphold the integrity of scholarly discourse.

Another critical concern arising from the use of AI systems in scholarly manuscript drafting pertains to authorship attribution. The collaborative interplay between human authors and AI systems complicates the delineation of individual contributions, prompting heightened scrutiny within the scholarly community. As artificial intelligence continues to advance, the increasing capability of these systems to autonomously generate coherent and contextually relevant text poses significant questions regarding authorship attribution. The integration of AI in the drafting process introduces a nuanced dimension, prompting concerns about the ethical and intellectual ownership of scholarly works. This shift towards AI-assisted drafting necessitates the establishment of clear and transparent guidelines for determining authorship, considering the collaborative nature of content creation involving both human and machine contributors. Consequently, there is a growing demand for robust mechanisms of authorship attribution, reflecting the imperative to acknowledge and delineate the distinct roles played by human researchers and AI systems in the evolving landscape of scholarly writing. Addressing this challenge is essential to uphold the integrity of academic output and navigate the intricacies of collaborative authorship in the era of advanced artificial intelligence.

To address the challenges faced by authors when it comes to drafting academic manuscripts, an example academic editor engine and its related functions, are provided herein. As will be described in greater detail below, the academic editor engine provides a platform in which authors can revise a scholarly manuscript with the aid of AI. In particular, the academic editor engine allows for use of a content generator, such as large language model (LLM), examples of which include generative pre-trained transformer (GPT) models or multimodal generative models, to revise sections of a scholarly manuscript. Unlike conventional use of AI systems to draft scholarly manuscripts, the academic editor engine generates an author attribution for content within the manuscript, clearly delineating what is drafted by the content generator and what is drafted by the scholar across numerous revisions.

To navigate the nuances of the scholarly manuscript drafting requirements, the academic editor engine generates prompts based on a specific section of a scholarly manuscript. Prompts generated for each section of a scholarly manuscript may contain different instructions for the content generator. As can be appreciated, the instructions for revising a specific section of the scholarly manuscript, such as the abstract, instruction, methods, results, etc., may have different drafting requirements, and by revising the manuscript section by section, and generating section specific prompts, the academic editor engine generates a revised section meeting the section requirements.

Once a revised section is generated by the content generator, the academic editor engine generates a display for the author in which the revised section is provided spatially proximate to the original or previous draft of the section (hereinafter the "previous section draft"). For example, the revised section may be provided next to the previous section draft, such that each sentence of the revised section aligns with a corresponding section in the previous section draft. This can allow the author to appreciate the revisions made by the content generator. In some cases, the academic editor engine may visibly modify the segments of text in both the previous section draft and the revised section to more clearly indicate the revisions made to the previous section draft by the revised section.

The author may review and analyze the revisions made to the previous section draft and choose to accept or reject each of the revisions. As used herein, accepting revisions may include accepting all of the revisions, rejecting all of the revisions, accepting a subset of the revisions while rejecting the rest, modifying a subset of the revisions and accepting the subset of modified revisions. Once the author accepts the revisions, the academic editor engine generates a revised section draft that incorporates the accepted revisions. The academic editor engine saves the revised section draft as a separate file from the previous section draft such that the author can review or revise the revised section draft or return to view the previous section draft at a later date. It should also be appreciated that the term "author" as used herein may encompass various individuals who participate in the drafting, editing, and publishing of a manuscript. As such, an author may include a copy editor, a contributor, a reviewer, and the drafting author. Additionally, while the academic editor engine is discussed herein in the context of drafting a manuscript, it should be appreciated that it may be used during drafting of other forms of papers, such as essays, research papers, position papers, review papers, presentations, and the like. The discussion herein is focused on manuscripts for case of illustration.

When the academic editor engine saves the revised section draft, the academic editor engine generates an author attribution for each content segment in the revised section draft. In other words, the academic editor engine identifies the segments of content within the revised section draft that include the revisions generated by the content generator and which segments of content were generated by the author. For example, the text within the revised section draft that corresponds to the accepted revisions may be highlighted, underlined, or otherwise tagged as generated by the content generator. In some cases, the academic editor engine also indicates that the author accepted the revisions. Often there are multiple authors drafting a single manuscript, and thus, identifying which author accepted revisions or drafted content segments can be helpful when it comes to author attribution.

As noted above, author attribution has become of increasing concern within the scientific community when it comes to manuscript drafting. As such, the academic editor engine and its related functionality provide a profound benefit to the academic and scientific community by clearly defining authorship attribution. Clarity in distinguishing between contributions originating from AI systems and those crafted by human authors ensures transparency, intellectual accountability, and ethical standards in scholarly discourse. This demarcation aids in upholding the integrity of authorship attribution, providing a clear understanding of the unique roles played by both human researchers and AI technologies in the collaborative creation of scholarly works. Additionally, precise delineation enhances the credibility of research findings, fostering a culture of trust within the academic community. Scholars, researchers, and readers can confidently navigate the intricate landscape of academic literature, appreciating the distinct insights brought forth by human expertise and the computational capabilities of AI. As the synergy between humans and AI continues to shape scholarly authorship, clearly defined boundaries contribute to a more robust, reliable, and ethical foundation for knowledge dissemination and scientific advancement.

Beyond demarcating content attribution, the academic editor engine also allows authors to trace content through numerous revisions and identify when content was drafted or otherwise introduced into the manuscript. The ability for an author to trace revisions made during the development of an academic manuscript brings forth numerous benefits to the scholarly writing process. Such traceability ensures transparency and accountability in the evolution of the document, allowing authors to meticulously review and understand the changes made at various stages. As such, the academic editor engine provides an enhanced editing environment for collaborative efforts, enabling co-authors or research collaborators to track modifications and maintain a comprehensive record of the manuscript's progression. Additionally, the capability to trace revisions enhances the author's ability to refine and strengthen the content iteratively. By providing a clear history of edits, the academic editor engine facilitates a more efficient and organized revision process, allowing authors to revisit and reconsider specific changes, ensuring coherence, and aligning the manuscript with evolving research objectives. Ultimately, the ability of the academic editor engine to trace revisions contributes to improved collaboration, quality assurance, and the overall integrity of the academic manuscript.

Another benefit of the academic editor engine is aiding scholars who are writing the manuscript in a language that is not their first language, such as English, through the drafting process. By utilizing the academic editor engine, scholars can focus their efforts primarily on the scientific content of their manuscripts, rather than expending considerable time and energy on perfecting their English language proficiency. The academic editor engine is equipped with advanced natural language processing capabilities that allows it to assist users in refining their writing, suggesting appropriate grammar and syntax corrections, and offering language enhancement suggestions. Consequently, scholars can confidently articulate their scientific ideas and findings without being encumbered by language barriers, thereby enhancing the clarity and coherence of their manuscripts. The streamlined approach provided by the academic editor engine not only accelerates the drafting process but also ensures that the scholarly work is effectively communicated to a global audience, fostering greater dissemination and understanding of scientific knowledge across linguistic boundaries.

Figure 11:
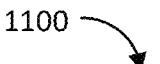
FIG. 11 shows an example computing device suitable for providing an academic editor engine and its related functions, according to an embodiment herein.

Turning now to the Figures, FIG. 1 illustrates an example operational environment for a system 100 for providing one or more features of an academic editor engine 102, according to an embodiment herein. The example system 100 includes an application service 101. The application service 101 employs one or more server computers 103 co-located with respect to each other or distributed across one or more data centers. Example servers include web servers, application servers, virtual or physical servers, or any combination or variation thereof, of which computing system 1101 in FIG. 11 is broadly representative.

The application service 101 provides users, such as client devices 105 and 107, a service, such as a manuscript application 111 for drafting scholarly manuscripts. In the illustrated example, the application service 101 may be a cloud-based application service operating on remote servers, such as the server computers 103, hosted on the internet, offering the client devices 105 and 107 convenient access to the manuscript application 111 without the need for local installation or maintenance. In the context of drafting scholarly manuscripts, the application service 101 provides the client devices 105 and 107 with the manuscript application 111 accessible through web browsers or dedicated software applications for drafting scholarly manuscripts. Examples of the manuscript application 111 may include Manubot, Overleaf, Authorea, or Scrivener.

As those skilled in the art appreciate, the application service 101 allows scholars to create, edit, and collaborate on manuscripts via the manuscript application 111 from any location with internet connectivity, storing the documents securely in the cloud. By leveraging the scalability and flexibility of cloud infrastructure, the application service 101 offers enhanced accessibility, seamless collaboration, and efficient document management capabilities to scholars, thereby optimizing their manuscript drafting process.

As noted above, the application service 101 also facilitates real-time collaboration between scholars, via the client devices 105 and 107, for manuscript drafting. In the illustrated example, client devices 105 and 107 may correspond to scholars who are authoring a shared manuscript based on their research. Although the client devices 105 and 107 are illustrated as representing scholars authoring a shared manuscript via the manuscript application 111, it should be appreciated that in some cases a manuscript may be drafted with only a single author, while in other cases, more than two scholars may be drafting the shared manuscript. In other words, there may be any number of the client devices 105 and 107 drafting a shared manuscript via the manuscript application 111.

As can be appreciated, the client devices 105 and 107 communicate with the application service 101 via one or more internets and intranets, the Internet, wired and wireless networks, local area networks (LANs), wide area networks (WANs), or any other type of network or combination thereof. Examples of the client devices 105 and 107 may include personal computers, tablet computers, mobile phones, gaming consoles, wearable devices, Internet of Things (IoT) devices, and any other suitable devices, of which computing system 1101 in FIG. 11 is also broadly representative.

To aid the client devices 105 and 107 with drafting of their shared manuscript via the manuscript application 111, an academic editor engine 102 and its related functions may be provided. In particular, the academic editor engine 102 may provide one or more content generation functions for aiding in drafting of specific sections of the shared manuscript. As noted above, each section of a scholarly manuscript is required to be drafted in a particular manner, meeting requirements agreed upon by the broader scientific community. As such, the academic editor engine 102 may revise a respective section of the shared manuscript drafted by the client devices 105 and 107 via the manuscript application 111 to ensure that these requirements are met. This process will be described in greater detail below with respect to FIGS. 2-10.

In addition to aiding in the drafting process, the academic editor engine 102 also tracks which content within the manuscript is drafted by the client devices 105 and 107 and which content is generated by AI systems, such as a content generator. In other words, the academic editor engine 102 determines author attribution for the content within the manuscript. In some cases, the academic editor engine 102 visually changes content that is generated by an AI system, thereby indicating author attribution to the content generator. The details of this process and variations in embodiments are described in greater detail below with respect to FIGS. 2-10.

To provide these functions, the academic editor engine 102 may employ one or more server computers 109 co-located with respect to each other or distributed across one or more data centers, of which computing system 1101 in FIG. 11 is broadly representative. In some embodiments, the academic editor engine 102 hosts one or more content generators on the server computers 109 as well. In other embodiments, the academic editor engine 102 and/or various components of the academic editor engine 102, such as a content generator, may be hosted separately from the academic editor engine 102, such as by a third party.

In some embodiments, the academic editor engine 102 may be loaded and executed locally, as part of the manuscript application 111, when running on the client devices 105 and 107. In some cases, however, the academic editor engine 102 may be executed remotely from the client devices 105 and 107. For example, the academic editor engine 102 may be executed by the application service 101 or by a third party. In other cases, one or more components or features of the academic editor engine 102 may be loaded and executed locally, while other components or features are loaded and executed remotely. For example, the academic editor engine 102 may include a content generator, an attribution generator, a section identifier, and a prompt generator, as will be described in greater detail with respect to FIG. 2. One or more of these components may be executed locally by the client devices 105 and 107, while one or more of these components may be executed remotely, by for example a third party or the application service 101. Various scenarios are described below in greater detail.

To provide the scholars with one or more functions, the academic editor engine 102 may be provided as part of the manuscript application 111 executing on the client devices 105 and 107. The academic editor engine 102 may be part or a feature of the manuscript application 111 or may be an add-in to the manuscript application 111. For example, a user may download and install the academic editor engine 102 as an "add-in" application that is integrated into the context of the main, manuscript application 111. Once integrated into the manuscript application 111, the client devices 105 and 107 may be able to access and employ the functions of the academic editor engine 102 to aid in their drafting of the shared manuscript.

Figure 2:
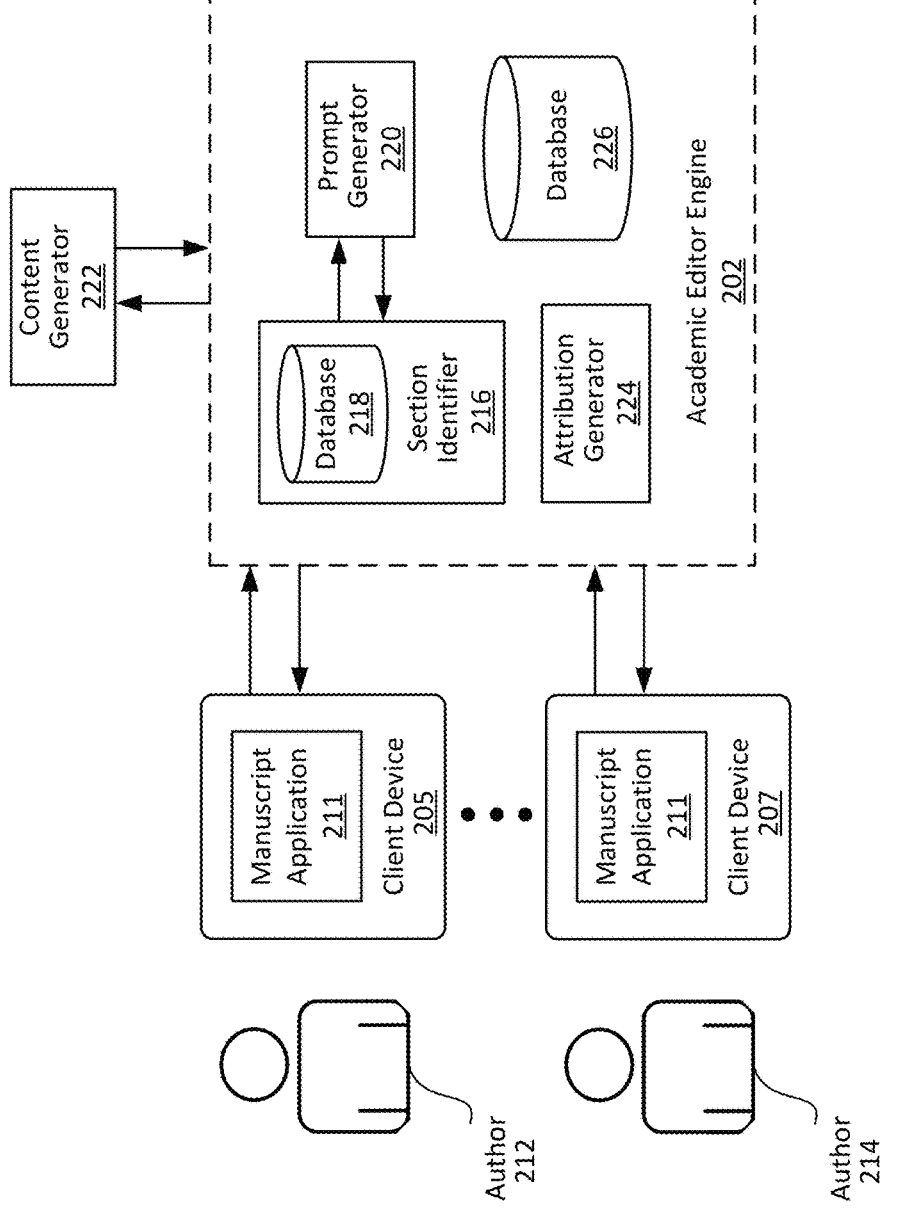
FIG. 2 illustrates an example operational environment including an academic editor engine, according to an embodiment herein.

Referring now to FIG. 2, an example operational environment 200 including an academic editor engine 202 is illustrated, according to an embodiment herein. The academic editor engine 202 may be the same or similar to the academic editor engine 102. For example, the academic editor engine 202 may be part of or executed as part of a manuscript application 211 to aid author 212 and author 214 during their drafting of a shared manuscript. As illustrated, different instances of the manuscript application 211 may be provided on client devices 205 and 207 for the authors 212 and 214, respectively. The client devices 205 and 207 may be the same or similar to the client devices 105 and 107.

For case of explanation, FIG. 2 is described in conjunction with FIGS. 3-10. Starting with FIG. 3, FIG. 3 provides an example academic editor engine process, in particular, a process 300 for providing the academic editor engine 202 and one or more of its functions, according to an embodiment herein. Although FIG. 3 is described with reference to FIG. 2, it should be appreciated that any steps of the process 300 may be used with components and elements from any of the other figures described herein.

As noted above, the authors 212 and 214 may be scholars that are drafting a shared manuscript via the manuscript application 211. The shared manuscript is a scholarly manuscript that may contain research findings, critical analysis, or theoretical insights within a specific field of study in which the authors 212 and 214 are scholars. The scholarly manuscript may be drafted with the intent for it to be peer reviewed and potentially published in one or more academic journals or scholarly books. As such, the shared manuscript may have drafting requirements to which the authors 212 and 214 may adhere to.

Referring now to FIG. 4, an example overview 400 of a manuscript 428 is illustrated, according to an embodiment herein. The overview 400 illustrates a first page of the manuscript 428 as well as provides a table of contents 432. As shown by the table of contents 432, the manuscript 428 includes numerous sections, such as Authors, Abstract, Introduction, Methodologies Used, Results, Conclusion, and References. As those skilled in the art appreciate, each of these sections may have respective requirements for drafting, ranging from content that has to be included to verb tenses used. For example, an abstract section 433 may be limited to a set of sentences with no citations, whereas an introduction section requires several references to other scientific papers.

To ensure that each section of the manuscript 428 meets the manuscript requirements, the authors 212 and 214 may utilize the academic editor engine 202. As noted above, the academic editor 202 may be executed in the context of the manuscript application 211. As such, one or both of the authors 212 and 214, via the client devices 205 and 207, respectively, may select a section, such as the abstract section 433, to revise using the academic editor engine 202 within the manuscript application 211 and use one or more of the following functions to revise the respective section. For the following discussion, the author 212 is described as revising the manuscript 428, however, it should be appreciated that the author 214, or any other author working on the manuscript 428 may work simultaneously on the manuscript 428, including revising the manuscript 428 using the academic editor engine 202.

As used herein, the term "section" may refer to the entirety of a given section, such as the entirety of the introduction section or it may refer to a portion of a given section. For example, when the author 212 selects the section 433, the author 212 may be selecting the entire section 433 or the author 212 may only be selecting a portion of the section 433 (e.g., a few sentences, a single paragraph).

In an example, the author 212, via the client device 205 may select the abstract section 433 of the manuscript 428 to revise using the academic editor engine 202. As such, the academic editor engine 202 receives a request to revise the abstract section 433 of the manuscript 428 from the client device 205 (305). Responsive to receiving the request, the academic editor engine 202 determines a section type for the abstract section 433 (310). To determine the section type, the academic editor engine 202 may include a section identifier 216. As the name suggests, the section identifier 216 may determine the section type corresponding to the abstract section 433.

The section identifier 216 may determine the section type based on information associated with the abstract section 433. For example, a file name associated with the abstract section 433 may be used to determine the section type. As those skilled in the art readily appreciate, manuscript drafting applications or tools are often drafted on a section-by-section basis. As such, corresponding folder or file names include the type of section. For example, within the manuscript application 211, the folder or file name corresponding to the abstract section 433 may be or include the term "Abstract." In other cases, the section identifier 216 may analyze the contents within the abstract section 433 to determine the section type. For example, the section identifier 216 may determine the section type based on a title (e.g., Abstract) or statement (e.g., "this is the abstract") within the abstract section 433. In an alternative embodiment, an author may manually input the section type and the section identifier 216 may determine the section type based on the author's input.

Once the academic editor engine 202 determines the section type corresponding to the abstract section 433, the academic editor 202 may determine the respective requirements for that section. As illustrated, the section identifier may include a database 218 which may store requirements for each of the sections within a scholarly manuscript. As will be described below, once the section type is identified, the respective requirements may be queried from the database 218 to be used as part of the revision process performed by the academic editor engine 202. As will be described below, in some cases, the respective requirements may include instructions to be used as part of a prompt for a content generator. In a case where the section identifier 216 is unable to determine the section type, the section identifier 216 may identify the section type as a generic section. In such a case, the academic editor 202 may determine the respective requirements for the generic section to include basic revisions, such as grammar, spelling, sentence structure, etc.

In addition to determining the section type, the academic editor engine 202 may also determine one or more properties of the manuscript 428 (315). Properties of the manuscript 428 may include a manuscript title, authors of the manuscript 428, and keywords for the manuscript 428. Keywords for the manuscript 428 are terms or phrases that succinctly capture the main topics, themes, or concepts addressed in the research of the manuscript 428. As those skilled in the art readily appreciate, keywords are often used to aid in the discoverability and indexing of the manuscript 428 within academic databases, facilitating targeted searches by readers and researchers. The academic editor engine 202 may determine the properties of the manuscript 428 from the content of the manuscript 428 itself or may prompt the author 412 to provide the properties. In some cases, the academic editor engine 202 may provide one or more sections of the manuscript 428 to a content generator, such as the content generator 222, to determine the properties of the manuscript 428, such as appropriate keywords for the manuscript 428.

Once the section type and the properties of the manuscript 428 are determined, the academic editor engine 202 generates a respective prompt (320). As shown, the academic editor engine 202 includes a prompt generator 220. The prompt generator 220 may generate a prompt for submission to a content generator 222. In particular, the prompt generator 220 generates a prompt for revising a selected section of the manuscript 428, such as the abstract section 433, based, in part, on the requirements identified by the section identifier 216.

Referring now to FIG. 5, an example prompt 500 is illustrated, according to an embodiment herein. The example prompt 500 includes instructions 534. The instructions 534 may be based, in part, off of the section requirements identified for the abstract section 433, as described above. That is, the prompt generator 220 may query the database 218 for the requirements for the abstract section 433 and generate the instructions 534 based on those requirements. The underlined and bolded terms in the instructions 534 may correspond to the requirements for an abstract section, such as the requirement to state the research problem/question and the solution proposed. The section requirements may also require inclusion of one or more properties of the manuscript 428, such as the manuscript title 536 and keywords 538A-C.

In some cases, the database 218 may provide an instructions template that includes a structure for the instructions 534 based on the section type. Here, the instructions template may include the italicized text of the instructions 534 and have placeholders for the manuscript title 536 and keywords 538A-C. In such a case, the prompt generator 220 may determine the manuscript title 536 and keywords 538A-C and insert them in the placeholders to generate the instructions 534.

It can be appreciated that in some examples, the author 212 may want to revise the instructions 534. As such, the academic editor engine 202 may provide the prompt 500 to the client device 205, from which the author 212 can revise the instructions 534. To revise the instructions 534, the author 212 may delete, revise, or add content to the instructions 534 using the client device 205.

In addition to the instructions 534, the prompt 500 may include the content of the abstract section 433 being revised. Here, the prompt 500 includes a file 542 for the abstract section 433, however, in other embodiments, the content of the abstract section 433 may be provided separately from the prompt 500 to the content generator 222. In other cases, the text within the abstract section 433 may be included following the instructions 534 or may be otherwise linked to the prompt 500 such that it can be identified and used by the content generator 222 during the revision process. The prompt generator 220 may determine the content of the abstract section 433 and attach it to the prompt 500 or otherwise include it as part of the prompt 500.

Once the prompt 500 is generated, the author 212 may select an option 544 to generate a revised section for the abstract section 433. In embodiments where the prompt 500 is not editable by the author 212, then the prompt 500 may not include the option 544 and instead the prompt 500 may be submitted by the prompt generator 220 after generation. Regardless, once the prompt 500 is completed, the academic editor engine 202 provides the prompt 500 and the abstract section 433 (or content of the abstract section 433) to the content generator 222 (325).

As noted above, the content generator 222 may be or include artificial intelligence (AI) technologies, such as Large Language Models (LLMs). As such, the content generator 222 may leverage advanced natural language processing algorithms to generate a revised section for the abstract section 433 that mimics human-written language but revises the content based on the instructions 534. In embodiments, the content generator 222 may include one or more generative pre-trained models, both proprietary and open source, remote or local, having deep learning architecture trained on vast amounts of textual data, examples of which include GPT-3, GPT-4, BERT (Bidirectional Encoder Representations from Transformers), LLAMA, T5 (Text-to-Text Transfer Transformer) and XLNet (eXtreme Multi-Label network).

Responsive to receiving the prompt 500 and the abstract section 433, the content generator 222 generates a revised section of the abstract section 433. The revised section is received by the academic editor engine 202 (330), which in turn generates a display of the revised section and the abstract section 433 (335). The display is provided by the academic editor engine 202 to the client device 205 for review by the author 212.

Figure 6:
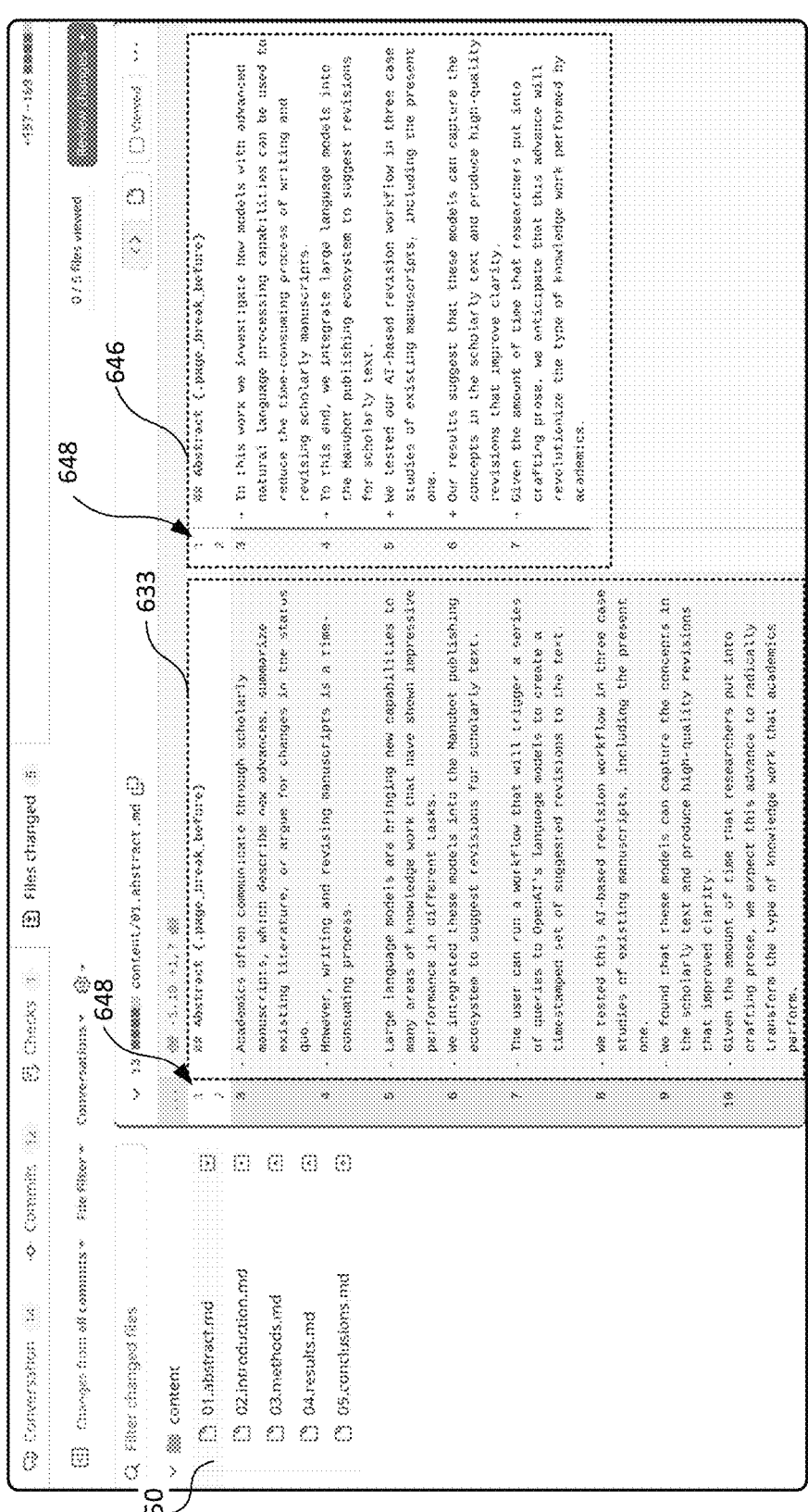
FIG. 6 illustrates an example display providing a revised section spatially proximate to an original section, according to an embodiment herein.

Referring now to FIG. 6, an example display 600 providing a revised section 646 spatially proximate to an original section 633 is illustrated, according to an embodiment herein. The display 600 may be generated and provided by the academic editor engine 202 to the author 212 via the client device 205. As shown, the display 600 includes an original section 633 which may be the same or similar to the abstract section 433. The original section 633 may be or include the content of the section being revised in a previous form. That is, the original section 633 may contain content as originally drafted by the author 212 or may include content as previously revised by the author 212. In other words, the original section 633 includes the content of the abstract section 433 that was provided to the content generator 222 for revision.

The revised section 646 includes content from the abstract section 433 as revised by the content generator 222. As illustrated, the display 600 provides the revised section 646 spatially proximate to the original section 633. Spatially proximate as used herein may mean that the revised section 646 is positioned next or close to the original section 633 such that the author 212 can easily review the changes made by the content generator 222. In the illustrated example, the spatial proximity of the revised section 646 to the original section 633 means that the textual content of each section 646 and 633 are aligned with one another for ease of review. In particular, the display 600 includes line numbers 648 for each section 646 and 633 that align respective sentences of each section. For example, a first sentence for each section 646 and 633 align with the "3" line number 648.

In the illustrated examples, the content generator 222 revised the original section 633 by rewriting the content of the original section 633. In particular, the content generator 222 significantly shortened the length of the original section 633, removing the first two sentences which incorrectly introduced correlation analysis and transcriptomics. Instead, the content generator 222 drafted the revised section 633 to clearly state the purpose of the manuscript 428. The content generator 222 also removed details about the method and focused on the aims and results obtained, as is appropriate per abstract requirements. Finally, the content generator 222 drafted the revised section 633 to suggest a broader application of the coefficient to other data domains, again as is appropriate per abstract requirements.

The display also includes a listing 650 so the author 212 can navigate to other revised sections of the manuscript 428. As shown, five sections of the manuscript 428 have been revised by the academic editor engine 202. If the author 212 desired to review a different revised section of the manuscript 428, the author 212 may navigate to that revised section by selecting the desired section on the listing 650.

Figure 7:
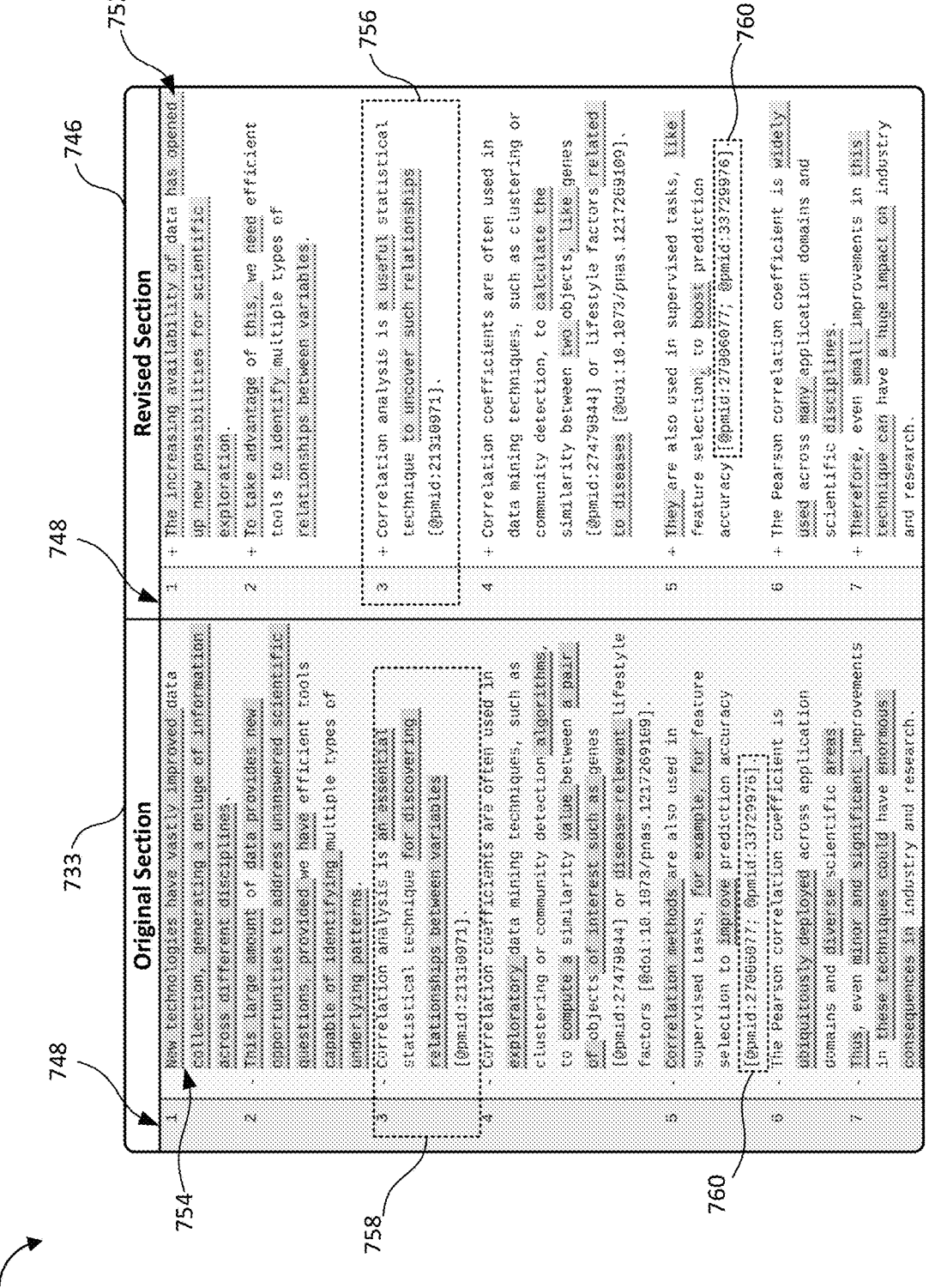
FIG. 7 illustrates an example display of an original section and a revised section having content visibly altered to indicate revisions, according to an embodiment herein.

In some cases, the academic editor engine 202 may visibly alter the text or content of the revised section 646 and/or the original section 633 to indicate changes made by the content generator 222. Turning now to FIG. 7, an example display 700 of an original section 733 and a revised section 746 having content visibly altered to indicate revisions is provided, according to an embodiment herein. The display 700 may be the same or similar to the display 600 in that the display 700 provides the revised section 746 spatially proximate to the original section 733. The revised section 746 may be the same or similar to the revised section 646 in that it is generated by the content generator 222 and revises the content of the original section 733, which may be the same or similar to the original section 633, based on a received prompt. In the illustrated example, the original section 733 may be for an introduction section of the manuscript 428.

In the illustrated example, the revised section 746 is spatially proximate to the original section 733 such that line numbers 748 for each respective section are aligned. Each line number 748 may indicate the start of a sentence in the respective section. As shown, the content generator 222 revised the content of the original section 733, producing a more concise and clearer introductory paragraph in the revised section 746.

To indicate the revisions made to the original text 733, the academic editor engine 202 may visibly alter or visibly indicate revisions 752. For example, the academic editor engine 202 may highlight and underline text, as is illustrated, that is added or removed. As illustrated, the revisions 752 in the revised section 746 indicates text that is added, while revisions 754 in the original section 733 indicates text that is removed. For example, for content 756 at line number 3 in the revised section 746, the revisions 752 are highlighted to indicate that the text of "a useful" and "to uncover such relationships" is added, while corresponding content 758 at line number 3 in the original section 733 includes the revisions 754 highlighted to indicate that the text of "an essential" and "for discovering relationships between variables" is removed. In particular, the content 756 and the content 758 are provided spatially proximate to each other so that the author 212 can understand that the text "a useful" revises the text "an essential," and similarly, the text "to uncover such relationships" revises the text "for discovering relationships between variables."

As those skilled in the art appreciate, scholarly manuscripts, such as the manuscript 428 are generally rife with non-text content, such as citations, graphics (e.g., figures, tables, graphs, images), and equations. If the section, such as the original section 733, includes non-text content, then the prompt 500 used to generate the revised section 746 may include instructions to keep the non-text content. As noted above, the original section 733 may be for the introduction section of the manuscript 428. As such, inclusion of citations may be proper. Accordingly, the original section 733 may include one or more citations 760. The prompt 500 used to generate the revised section 746 may include instructions 534 that "citations are kept" in the revised section 746. Following these instructions 534, the content generator 222 generates the revised section 746 to include the citations 760.

Figure 8:
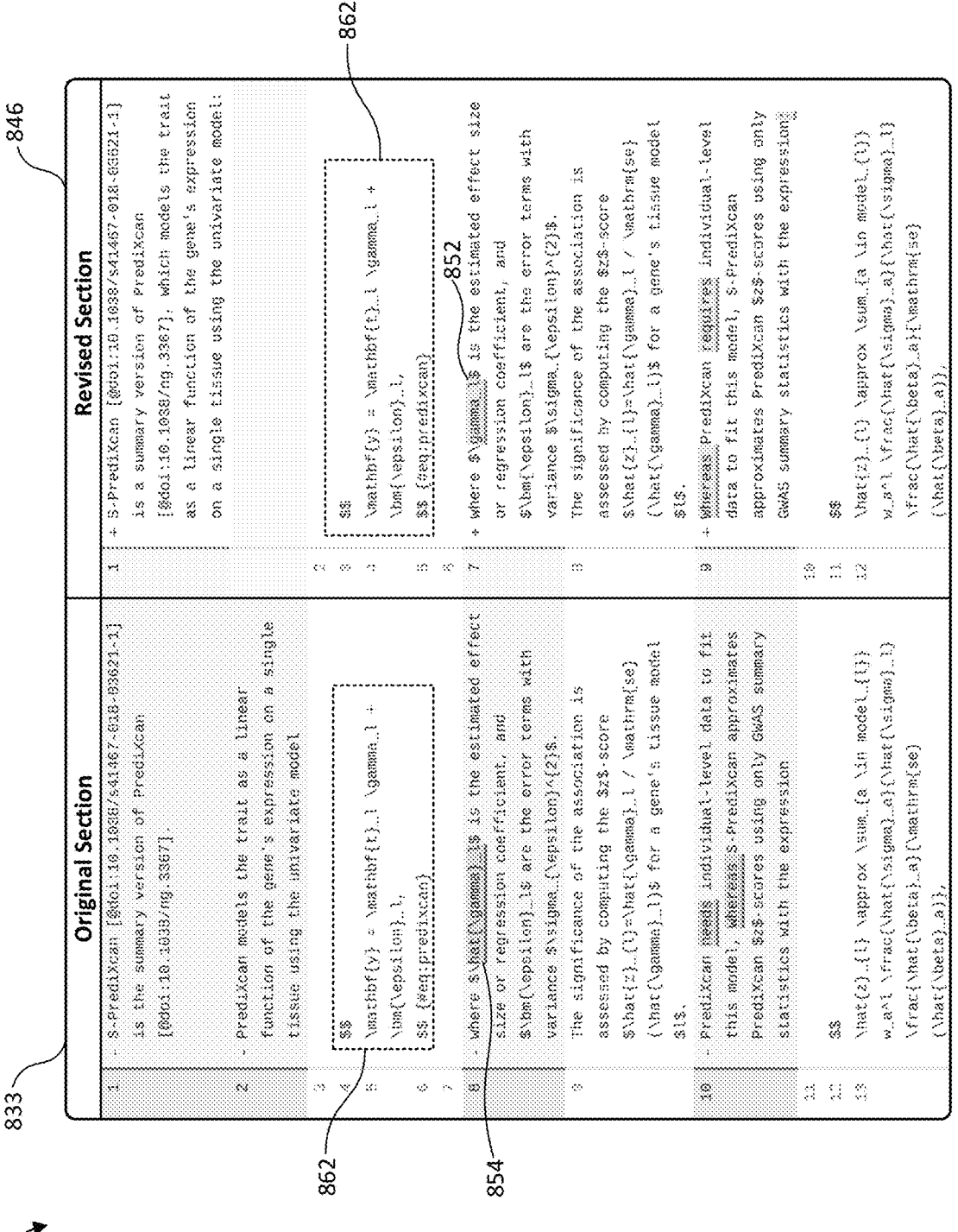
FIG. 8 illustrates another example display of an original section and a revised section having content visibly altered to indicate revisions, respectively, according to an embodiment herein.

Referring now to FIG. 8, an example display 800 of an original section 833 and a revised section 846 having content visibly altered to indicate revisions is provided, according to an embodiment herein. The display 800 may be the same or similar to the display 600 in that the display 800 provides the revised section 846 spatially proximate to the original section 833. The revised section 846 may be the same or similar to the revised section 846 in that it is generated by the content generator 222 and revises the content of the original section 846, which may be the same or similar to the original section 633, based on a received prompt.

In the illustrated example, the original section 833 may be for a methods section of the manuscript 428. As such, the original section 833 may include one or more equations 862. Since the original section 833 includes equations 862, the prompt 500 used to generate the revised section 846 may include instructions 534 to keep the equations 862. In addition to keeping the equations 862, however, the instructions 534 may also direct the content generator 222 to check the variable references in the equations 862. As such, the content generator 222 may check the variable references to ensure the correct references are used and/or variable references are used consistently. In the illustrated example, a revision 852 in the revised section 846 corrects the variable reference in the equation 862 to \gamma_1 from the incorrect reference of What {\gamma}_1. As indicated by revision 854, the incorrect reference is removed in the revised section 846.

Referring now to FIG. 9, an example display 900 of an original section 933 and a revised section 946 having content visibly altered to indicate revisions is provided, according to an embodiment herein. The display 900 may be the same or similar to the display 600 in that the display 900 provides the revised section 946 spatially proximate to the original section 933. The revised section 946 may be the same or similar to the revised section 646 in that it is generated by the content generator 222 and revises the content of the original section 946, which may be the same or similar to the original section 633, based on a received prompt.

In the illustrated example, the original section 933 may be for a results section of the manuscript 428. As such, the original section 933 may include one or more graphics 964. As such the prompt 500 used to generate the revised section 946 may include instructions 534 to keep the one or more graphics 964. In some cases, any text or caption related to the graphics 964 may not be revised by the content generator 222 and instead may be copied directly into the revised section 946. As used herein, the graphics 964 may include charts, diagrams, maps, illustrations or images, infographics, figures, tables, and schematics.

Referring now to FIG. 7 for ease of discussion, once the author 212 reviews the revisions 752 and 754 provided by the revised section 746, the author 212 can determine whether to accept or reject all of the revisions 752 and 754, or individually accept or reject each of the revisions 752 and 754. For example, the author 212 may select a revision 752 and indicate to accept or reject the revision 752. In other cases, the display 700 may include an option (not shown) to accept all revision 752/754 or rejection all revisions 752/754.

Responsive to receiving an indication from the client device 205 to accept one or more revisions 752/754 (340), the academic editor engine 202 may generate a revised draft of the original section 733 (345). The revised draft may include the revisions 752/754 that the author 212 accepted. Within the revised draft, the academic editor engine 202 may generate and include an author attribution to the content generator 222 for the accepted revisions 752/754. In particular, the academic editor engine 202 may include an attribution generator 224 that generates an author attribution for each revised draft. An author attribution may be or include a note or indication that the content (e.g., text) corresponding to the revisions 752/754 was generated by the content generator 222. For example, in the revised draft, a comment attached to the content associated with the revisions 752/754, noting the author attribution to the content generator 222. In other cases, the content corresponding to the revisions 752/754 may be a different color, highlighted, underlined, or otherwise modified to be visibly different from other content within the revised draft.

In some cases, the author attribution in the revised draft also indicates which author accepted the revisions 752/754. For example, the revised draft may indicate in a header or note that it was generated by the author 212. If the author 214 subsequently revises the revised draft following the revision process described above to generate a second revised draft, the author attribution generated by the attribution generator 224 may indicate which content is accepted by the author 212 during the first revision process, which content is accepted by the author 214, and which content is generated by the content generator 222. As noted above, clearly delincating content that is drafted by a human author and what content is drafted by the content generator 222 is vital for upholding the integrity of academic output and fostering trust within the academic community.

Figure 10:
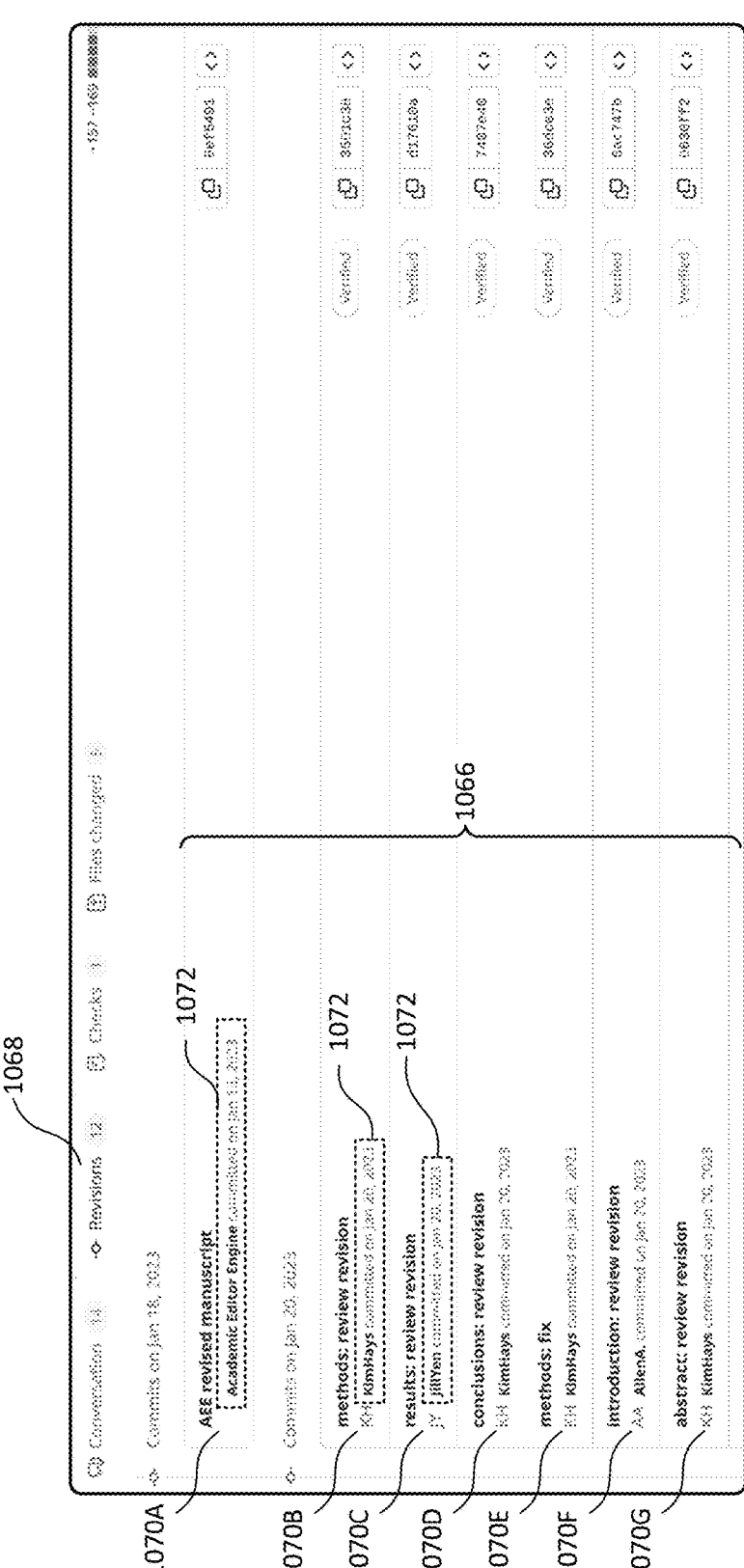
FIG. 10 illustrates an example display providing a revisions history for a manuscript, according to an embodiment herein.

Each revised draft that is generated is stored by the academic editor engine 202 in a database 226. Each revised draft is stored separately from a previous instance or draft such that the history of revisions for each section can be clearly followed and reviewed. Referring now to FIG. 10, an example display 1000 providing a revisions history 1066 for a manuscript is illustrated, according to an embodiment herein. For example, the revisions history 1066 may include each revision that was made to sections within the manuscript 428.

To view the manuscript 428, a user (e.g., an author, reviewer, or contributor) may select a revisions tab 1068. Upon selection of the revisions tab 1068, the revisions history 1066 may be provided. As shown, the revisions history 1066 may include revisions 1070A-G that were made to various sections of the manuscript 428. Each revision 1070A-G may correspond to a revised draft generated either by an author (e.g., authors 212 and 214) or by a revised draft generated by the academic editor engine 202.

As illustrated, each of the revisions 1070A-G correspond to a revised draft that is committed by one of the authors 212 or 214 of the manuscript 428. Committing within the context of manuscript drafting typically refers to the act of finalizing or confirming changes, revisions, edits, or additions made to the manuscript 428. If a user desires to see the changes made for each of the revisions 1070A-G, the user can select a desired revision and be provided with a display of the revised draft. The display of the revised draft may be the same or similar to the display 700 in that it shows the revisions made to the previous versions of the section. In some cases, the display provided may include both the original section 733 (e.g., the previous version of the section) and the revised draft, while in other cases, the display may only provide the revised draft, In either case, the revised draft includes author attribution for content within the section that was generated by the content generator 222, and in some cases, for content generated by each of the authors 212 and 214.

As shown, each of the revisions 1070A-G indicate which author committed the revision with an author attribution 1072. For example, the author attribution 1072 for the revision 1070A indicates that the Academic Editor Engine 202 generated the revised draft, while the author attribution 1072 for the revision 1070B indicates that Kim Hays, who may correspond to the author 212, generated or committed the revised draft, and the author attribution 1072 for the revision 1070C indicates that Jill Yen, who may correspond to the author 214, generated or committed the revised draft. The author attribution 1072 provided as part of the labeling of each revised draft may be in addition to the author attributions provided within each revised draft. As described above, content that is generated by the content generator 222 may be indicated as generated by the content generator 222 via an author attribution within the revised draft.

Referring now to FIG. 11, is a diagram of a system 1100 configured to implement an academic editor engine, according to an embodiment herein. The system 1100 may be an example of an apparatus including a computing system 1101 that is representative of any system or collection of systems in which the various processes, systems, programs, services, and scenarios disclosed herein may be implemented. For example, computing system 1101 may be an example academic editor engine, such as the academic editor engine 102, an application service, such as the application service 101, or any of the subcomponents depicted in system 100 of FIG. 1. Examples of computing system 1101 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing system 1101 may be implemented as a single apparatus, system, or device or may be implemented in a distributed manner as multiple apparatuses, systems, or devices. Computing system 1101 may include, but is not limited to, processing system 1102, storage system 1103, software 1105, communication interface system 1107, and user interface system 1109. Processing system 1102 may be operatively coupled with storage system 1103, communication interface system 1107, and user interface system 1109.

Processing system 1102 may load and execute software 1105 from storage system 1103. Software 1105 may include an academic editor process 1106, which may be representative of any of the operations for providing an academic editor engine or any of its related functions, as discussed with respect to the preceding figures. When executed by processing system 1102, software 1105 may direct processing system 1102 to operate as described herein for at least the various processes, such as the process 300, operational scenarios, and sequences discussed in the foregoing implementations. Computing system 1101 may optionally include additional devices, features, or functionality not discussed for purposes of brevity.

In some embodiments, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 may include general purpose central processing units, graphical processing units, application specific processors, and logic devices, as well as any other type of processing device, combinations, or variations thereof.

Storage system 1103 may comprise any memory device or computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including academic editor process 1106 among other functions) may be implemented in program instructions that may, when executed by processing system 1102, direct processing system 1102 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system as described herein. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing an academic editor engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; and one or more processors communicatively coupled to the non-transitory computer-readable medium and configured to execute processor-executable instructions stored in the non-transitory computer-readable medium to: receive, by an academic editor engine, a request to revise a first section of a scholarly manuscript from a first client device, wherein: the scholarly manuscript comprises a plurality of sections; and the plurality of sections comprises the first section; determine a section type for the first section; determine one or more properties of the scholarly manuscript; generate a first prompt based on the section type for the first section, wherein the first prompt comprises the one or more properties; provide the first prompt and the first section of the scholarly manuscript to a content generator; receive a first revised section of the first section from the content generator, wherein: the first revised section is generated by the content generator based on the first prompt; and the first revised section comprises a plurality of revisions to the first section; generate a first display of the first revised section spatially proximate to the first section to the first client device; receive an indication from the first client device to accept one or more of the plurality of revisions to the first revised section as first accepted revisions; and generate a first revised draft of the first section comprising the first accepted revisions, wherein the first revised draft comprises a first author attribution to the content generator for the first accepted revisions.

Example 2 is the system of any previous or subsequent Example, wherein the first author attribution to the content generator for the first accepted revisions comprises highlighting the first accepted revisions to indicate that the first accepted revisions were generated by the content generator.

Example 3 is the system of any previous or subsequent Example, wherein the processor-executable instructions cause the one or more processors to further execute processor-executable instructions stored in the non-transitory computer-readable medium to: receive a second request to revise the first revised section of the scholarly manuscript from the first client device; generate a second prompt based on the section type for the first revised section; provide the second prompt and the first revised section of the scholarly manuscript to a content generator; receive a second revised section of the first revised section from the content generator, wherein: the second revised section is generated by the content generator based on the second prompt; and the second revised section comprises a second plurality of revisions to the first revised section; generate a second display of the second revised section spatially proximate to the first revised section to the first client device; receive an indication from the first client device to accept one or more of the second plurality of revisions to the second revised section as second accepted revisions; and generate a second revised draft of the first revised section comprising the second accepted revisions, wherein the second revised draft comprises a first author attribution to the content generator for the first accepted revisions and the second accepted revisions.

Example 4 is the system of any previous or subsequent Example, wherein the processor-executable instructions cause the one or more processors to further execute processor-executable instructions stored in the non-transitory computer-readable medium to: receive a request to compare the first section and the second revised section; and generate a third display of the first section spatially proximate to the second revised section.

Example 5 is the system of any previous or subsequent Example, wherein the processor-executable instructions cause the one or more processors to further execute processor-executable instructions stored in the non-transitory computer-readable medium to: determine that the first section comprises one or more graphics; and generate an instruction to keep the one or more graphics in the first revision of the first section, wherein the prompt comprises the instruction.

Example 6 is the system of any previous or subsequent Example, wherein the processor-executable instructions cause the one or more processors to further execute processor-executable instructions stored in the non-transitory computer-readable medium to: determine that the first section comprises one or more equations; determine that the one or more equations comprise one or more symbols; and generate a first instruction to keep the one or more equations in the first revision of the first section; and generate a second instruction to define the one or more symbols present within the one or more equations, wherein the prompt comprises the first instruction and the second instruction.

Example 7 is the system of any previous or subsequent Example, wherein: the first revised draft comprises the first accepted revisions and original content, wherein the original content is generated by the first client device; and the processor-executable instructions cause the one or more processors to further execute processor-executable instructions stored in the non-transitory computer-readable medium to: generate a second author attribution to the first client device for the original content.

Example 8 is a method comprising: receiving, by an academic editor engine, a request to revise a first section of a scholarly manuscript from a first client device, wherein: the scholarly manuscript comprises a plurality of sections; and the plurality of sections comprise the first section; determining a section type for the first section; determining one or more properties of the scholarly manuscript; generating a first prompt based on the section type for the first section, wherein the first prompt comprises the one or more properties; providing the first prompt and the first section of the scholarly manuscript to a content generator; receiving a first revised section of the first section from the content generator, wherein: the first revised section is generated by the content generator based on the first prompt; and the first revised section comprises a plurality of revisions to the first section; generating a first display of the first revised section spatially proximate to the first section to the first client device; receiving an indication from the first client device to accept one or more of the plurality of revisions to the first revised section as first accepted revisions; and generating a first revised draft of the first section comprising the first accepted revisions, wherein the first revised draft comprises a first author attribution to the content generator for the first accepted revisions.

Example 9 is the method of any previous or subsequent Example, wherein the method further comprises: receiving a second request to revise a second section of the scholarly manuscript from the first client device, wherein the plurality of sections comprise the second section; generating a second prompt based on the section type for the second section; providing the second prompt and the second section of the scholarly manuscript to a content generator; receiving a second revised section of the second section from the content generator, wherein: the second revised section is generated by the content generator based on the second prompt; and the second revised section comprises a second plurality of revisions to the first revised section; generating a second display of the second revised section spatially proximate to the second section to the second client device; receiving an indication from the first client device to accept one or more of the second plurality of revisions to the second revised section as second accepted revisions; and generating a second revised draft of the second section comprising the second accepted revisions, wherein the second revised draft comprises a second author attribution to the content generator for the second accepted revisions.

Example 10 is the method of any previous or subsequent Example, wherein generating the first prompt based on the first type of the first section, further comprises: providing a first set of instructions for the first prompt based on first section to first client device; receiving one or more edits to the first set of instructions for the first prompt; and generating a first revised prompt based on the one or more edits to the first set of instructions.

Example 11 is the method of any previous or subsequent Example, wherein determining the section type for the first section comprise: receiving a first file corresponding to the first section, wherein the first file comprises a file name; and determining the section type for the first section based on the file name of the first file.

Example 12 is the method of any previous or subsequent Example, wherein the first author attribution further comprises an indication that the first client device accepted the first accepted revisions.

Example 13 is the method of any previous or subsequent Example, wherein the method further comprises: receiving a selection of a subset of the first accepted revisions from the first client device; and highlighting the first accepted revisions to indicate the first author attribution to the content generator for the first accepted revisions.

Example 14 is the method of any previous or subsequent Example, wherein: the first revised draft comprises the first accepted revisions and original content, wherein the original content is generated by the first client device; and the method further comprises generating a second author attribution to the first client device for the original content.

Example 15 is a non-transitory computer-readable medium comprising processor-executable instructions configured to cause one or more processors to: receive, by an academic editor engine, a request to revise a first section of a scholarly manuscript from a first client device wherein: the scholarly manuscript comprises a plurality of sections; and the plurality of sections comprise the first section; determine a section type for the first section; determine one or more properties of the scholarly manuscript; generate a first prompt based on the section type for the first section, wherein the first prompt comprises the one or more properties; provide the first prompt and the first section of the scholarly manuscript to a content generator; receive a first revised section of the first section from the content generator, wherein: the first revised section is generated by the content generator based on the first prompt; and the first revised section comprises a plurality of revisions to the first section; generate a first display of the first revised section spatially proximate to the first section to the first client device; receive an indication from the first client device to accept one or more of the plurality of revisions to the first revised section as first accepted revisions; and generate a first revised draft of the first section comprising the first accepted revisions, wherein the first revised draft comprises a first author attribution to the content generator for the first accepted revisions.

Example 16 is the non-transitory computer-readable medium of any previous or subsequent Example, wherein the processor-executable instructions stored in the non-transitory computer-readable medium are further configured to cause the one or more processors to: receiving a second request to revise the first revised section of the scholarly manuscript from a second client device; generating a second prompt based on the section type for the first revised section; providing the second prompt and the first revised section of the scholarly manuscript to a content generator; receiving a second revised section of the first revised section from the content generator, wherein: the second revised section is generated by the content generator based on the second prompt; and the second revised section comprises a second plurality of revisions to the first revised section; generating a second display of the second revised section spatially proximate to the first revised section to the second client device; receiving an indication from the second client device to accept one or more of the second plurality of revisions to the second revised section as second accepted revisions; and generating a second revised draft of the first revised section comprising the second accepted revisions, wherein the second revised draft comprises a first author attribution to the content generator for the first accepted revisions and the second accepted revisions.

Example 17 is the non-transitory computer-readable medium of any previous or subsequent Example, wherein the first author attribution comprises an indication that the second client device accepted the second accepted revisions.

Example 18 is the non-transitory computer-readable medium of any previous or subsequent Example, wherein the processor-executable instructions stored in the non-transitory computer-readable medium are further configured to cause the one or more processors to: receive an indication to review revisions made to the scholarly manuscript; and generate an overview display of the plurality of sections of the scholarly manuscript, wherein the overview display indicates a number of revised drafts for each respective section of the plurality of sections.

Example 19 is the non-transitory computer-readable medium of any previous or subsequent Example, wherein the processor-executable instructions stored in the non-transitory computer-readable medium are further configured to cause the one or more processors to: receive a selection of the first section; and provide a revision display comprising a plurality of revised drafts for the first section, wherein the plurality of revised drafts comprises the first revised draft.

Example 20 is the non-transitory computer-readable medium of any previous or subsequent Example, wherein the processor-executable instructions to determine the section type for the first section further cause the one or more processors to: determine that the first section comprises one or more citations; and generate an instruction to keep the one or more citations in the first revision of the first section, wherein the prompt comprises the instruction.

What is claimed is:

1. A system comprising:
a non-transitory computer-readable medium;
an academic editor engine comprising processor-executable instructions stored on the non-transitory computer-readable medium; and
one or more processors communicatively coupled to the non-transitory computer-readable medium and configured to execute the processor-executable instructions stored in the non-transitory computer-readable medium to:
receive a request to revise a first section of a scholarly manuscript from a first client device, wherein the scholarly manuscript comprises a plurality of sections and the plurality of sections comprises the first section;
determine a section type for the first section;
generate a first prompt based on the section type for the first section;
provide the first prompt and the first section of the scholarly manuscript to a machine-based content generator;
receive a first revised section of the first section from the machine-based content generator, wherein the first revised section comprises a plurality of revisions to the first section;
generate a first display of the first revised section spatially proximate to the first section on the first client device;
receive an indication from the first client device to accept one or more of the plurality of revisions to the first revised section as first accepted revisions; and
generate a first revised draft of the first section comprising the first accepted revisions and original content, wherein the first revised draft comprises;
a first author attribution to the machine-based content generator for the first accepted revisions; and
a second author attribution to a first user of the first client device for the original content generated by the first user of the first client device.

2. The system of claim 1, wherein the first author attribution to the machine-based content generator for the first accepted revisions comprises highlighting the first accepted revisions to indicate that the first accepted revisions were generated by the machine-based content generator.

3. The system of claim 1, wherein the processor-executable instructions cause the one or more processors to further execute processor-executable instructions stored in the non-transitory computer-readable medium to:

receive a second request to revise the first revised section of the scholarly manuscript from the first client device;
generate a second prompt based on the section type for the first revised section;
provide the second prompt and the first revised section of the scholarly manuscript to the machine-based content generator;
receive a second revised section of the first revised section from the machine-based content generator, wherein the second revised section comprises a second plurality of revisions to the first revised section;
generate a second display of the second revised section spatially proximate to the first revised section on the first client device;
receive an indication from the first client device to accept one or more of the second plurality of revisions to the second revised section as second accepted revisions; and
generate a second revised draft of the first revised section comprising the second accepted revisions, wherein the second revised draft comprises a first author attribution to the machine-based content generator for the first accepted revisions and the second accepted revisions.

4. The system of claim 3, wherein the processor-executable instructions cause the one or more processors to further execute processor-executable instructions stored in the non-transitory computer-readable medium to:
receive a request to compare the first section and the second revised section; and
generate a third display of the first section spatially proximate to the second revised section.

5. The system of claim 1, wherein the processor-executable instructions cause the one or more processors to further execute processor-executable instructions stored in the non-transitory computer-readable medium to:
determine that the first section comprises one or more graphics; and
generate an instruction to keep the one or more graphics in the first revision of the first section, wherein the prompt comprises the instruction.

6. The system of claim 1, wherein the processor-executable instructions cause the one or more processors to further execute processor-executable instructions stored in the non-transitory computer-readable medium to:
determine that the first section comprises one or more equations;
determine that the one or more equations comprise one or more symbols;
generate a first instruction to keep the one or more equations in the first revision of the first section; and
generate a second instruction to define the one or more symbols present within the one or more equations, wherein the prompt comprises the first instruction and the second instruction.

7. The system of claim 1, wherein: the processor-executable instructions cause the one or more processors to further execute processor-executable instructions stored in the non-transitory computer-readable medium to:
determine one or more properties of the scholarly manuscript; and
generate the first prompt to include the one or more properties.

8. A method comprising:
receiving, by an academic editor engine, a request to revise a first section of a scholarly manuscript from a first client device, wherein the scholarly manuscript comprises a plurality of sections and the plurality of sections comprise the first section;

determining, by the academic editor engine, a section type for the first section;

generating, by the academic editor engine, a first prompt based on the section type for the first section;

providing, by the academic editor engine, the first prompt and the first section of the scholarly manuscript to a machine-based content generator;

receiving, by the academic editor engine, a first revised section of the first section from the machine-based content generator, wherein the first revised section comprises a plurality of revisions to the first section;

generating, by the academic editor engine, a first display of the first revised section spatially proximate to the first section on the first client device;

receiving, by the academic editor engine, an indication from the first client device to accept one or more of the plurality of revisions to the first revised section as first accepted revisions; and generating, by the academic editor engine, a first revised draft of the first section comprising the first accepted revisions and original content, wherein the first revised draft comprises:

a first author attribution to the machine-based content generator for the first accepted revisions; and a second author attribution to a first user of the first client device for the original content generated by the first user of the first client device.

9. The method of claim 8, wherein the method further comprises:

receiving, by the academic editor engine, a second request to revise a second section of the scholarly manuscript from the first client device, wherein the plurality of sections comprise the second section;

generating, by the academic editor engine, a second prompt based on the section type for the second section;

providing, by the academic editor engine, the second prompt and the second section of the scholarly manuscript to the machine-based content generator;

receiving, by the academic editor engine, a second revised section of the second section from the machine-based content generator, wherein the second revised section comprises a second plurality of revisions to the first revised section;

generating, by the academic editor engine, a second display of the second revised section spatially proximate to the second section on the second client device;

receiving, by the academic editor engine, an indication from the first client device to accept one or more of the second plurality of revisions to the second revised section as second accepted revisions; and generating, by the academic editor engine, a second revised draft of the second section comprising the second accepted revisions, wherein the second revised draft comprises a second author attribution to the machine-based content generator for the second accepted revisions.

10. The method of claim 8, wherein generating, by the academic editor engine, the first prompt based on the first type of the first section, further comprises:

providing, by the academic editor engine, a first set of instructions for the first prompt based on the first section to the first client device;

receiving, by the academic editor engine, one or more edits to the first set of instructions for the first prompt; and generating, by the academic editor engine, a first revised prompt based on the one or more edits to the first set of instructions.

11. The method of claim 8, wherein determining, by the academic editor engine, the section type for the first section comprise:

receiving, by the academic editor engine, a first file corresponding to the first section, wherein the first file comprises a file name; and determining, by the academic editor engine, the section type for the first section based on the file name of the first file.

12. The method of claim 8, wherein the first author attribution further comprises an indication that the first user of the first client device accepted the first accepted revisions.

13. The method of claim 8, wherein the method further comprises:

receiving, by the academic editor engine, a selection of a subset of the first accepted revisions from the first client device; and highlighting, by the academic editor engine, the first accepted revisions to indicate the first author attribution to the machine-based content generator for the first accepted revisions.

14. A non-transitory computer-readable medium comprising processor-executable instructions, wherein the processor-executable instructions comprise an academic editor engine configured to cause one or more processors to:

receive a request to revise a first section of a scholarly manuscript from a first client device wherein the scholarly manuscript comprises a plurality of sections and the plurality of sections comprise the first section;

determine a section type for the first section;

generate a first prompt based on the section type for the first section;

provide the first prompt and the first section of the scholarly manuscript to a machine-based content generator;

receive a first revised section of the first section from the machine-based content generator, wherein the first revised section comprises a plurality of revisions to the first section;

generate a first display of the first revised section spatially proximate to the first section on the first client device;

receive an indication from the first client device to accept one or more of the plurality of revisions to the first revised section as first accepted revisions; and generate a first revised draft of the first section comprising the first accepted revisions and original content, wherein the first revised draft comprises:

a first author attribution to the machine-based content generator for the first accepted revisions; and a second author attribution to a first user of the first client device for the original content generated by the first user of the first client device.

15. The non-transitory computer-readable medium of claim 14, wherein the processor-executable instructions stored in the non-transitory computer-readable medium comprising the academic editor engine are further configured to cause the one or more processors to:

receive a second request to revise the first revised section of the scholarly manuscript from a second client device;

generate a second prompt based on the section type for the first revised section;

provide the second prompt and the first revised section of the scholarly manuscript to the machine-based content generator;

receive a second revised section of the first revised section from the machine-based content generator, wherein the second revised section comprises a second plurality of revisions to the first revised section;

generate a second display of the second revised section spatially proximate to the first revised section on the second client device;

receive an indication from the second client device to accept one or more of the second plurality of revisions to the second revised section as second accepted revisions; and generate a second revised draft of the first revised section comprising the second accepted revisions, wherein the second revised draft comprises a first author attribution to the machine-based content generator for the first accepted revisions and the second accepted revisions.

16. The non-transitory computer-readable medium of claim 15, wherein the first author attribution comprises an indication that a second user of the second client device accepted the second accepted revisions.

17. The non-transitory computer-readable medium of claim 14, wherein the processor-executable instructions stored in the non-transitory computer-readable medium comprising the academic editor engine are further configured to cause the one or more processors to:

receive an indication to review revisions made to the scholarly manuscript; and generate an overview display of the plurality of sections of the scholarly manuscript, wherein the overview display indicates a number of revised drafts for each respective section of the plurality of sections.

18. The non-transitory computer-readable medium of claim 17, wherein the processor-executable instructions stored in the non-transitory computer-readable medium comprising the academic editor engine are further configured to cause the one or more processors to:

receive a selection of the first section; and provide a revision display comprising a plurality of revised drafts for the first section, wherein the plurality of revised drafts comprises the first revised draft.

19. The non-transitory computer-readable medium of claim 14, wherein the processor-executable instructions to determine the section type for the first section further cause the one or more processors to:

determine that the first section comprises one or more citations; and generate an instruction to keep the one or more citations in the first revised section of the first section, wherein the prompt comprises the instruction.

* * * * *